United States Patent [19]
Voorhees

[11] 3,819,264
[45] June 25, 1974

[54] METHOD AND SYSTEM FOR PRODUCTION OF ILLUSTRATED TEXTS
[75] Inventor: Charles H. Voorhees, Burbank, Calif.
[73] Assignee: Lockheed Aircraft Corporation, Burbank, Calif.
[22] Filed: Jan. 12, 1973
[21] Appl. No.: 323,328

[52] U.S. Cl.................... 355/43, 354/77, 354/110, 355/66
[51] Int. Cl..................... G03b 27/70, G03b 29/00
[58] Field of Search.............. 95/1, 1.1, 12; 355/20, 355/40–43, 66

[56] References Cited
UNITED STATES PATENTS
| | | | |
|---|---|---|---|
| 3,537,788 | 11/1970 | Young | 355/40 |
| 3,626,824 | 12/1971 | Kolb et al. | 355/40 X |
| 3,673,932 | 7/1972 | Rottmiller | 355/43 X |
| 3,673,933 | 7/1972 | Hamann | 355/43 X |
| 3,677,146 | 7/1972 | Nielsen | 95/1.1 |

Primary Examiner—Samuel S. Matthews
Assistant Examiner—Richard A. Wintercorn
Attorney, Agent, or Firm—Billy G. Corber; Ralph M. Flygare

[57] ABSTRACT

A method and system for the high speed production of illustrated texts wherein textual material is photographically combined with designated illustrative material and the text is prepared from the composite photographic record. The textual material, including illustration identifying indicia, is stored and the stored textual material is electronically displayed for exposure of the photographic film thereto. Illustration identifying indicia associated with displayed textual material is utilized to select a slide containing the desired illustrative material and an image of the illustrative material from the slide is projected onto the film to form a composite photographic record. The illustrated text may then be formed from the composite photographic record.

10 Claims, 2 Drawing Figures

METHOD AND SYSTEM FOR PRODUCTION OF ILLUSTRATED TEXTS

BACKGROUND OF THE INVENTION

The present invention relates to a method and system for producing illustrated texts and more specifically to a method and a system for rapidly combining textual material with illustrations in the production of customized illustrated parts catalogs and maintenance manuals, or the like, such as used in the aircraft and automotive industry.

Illustrated texts have been produced in the past largely through the use of manual techniques. For example, in producing parts catalogs in which a large number of illustrations accompany textual material, the illustrations are ordinarily perpared photographically and are manually attached in their proper positions on pages of text prepared manually or on a printer. This method of producing illustrated text is extremely burdensome where the illustrated text is standard for all equipment and where the equipment remains virtually unchanged during its life. However, in the event that each customer is supplied with equipment customized to its specifications and where large numbers of revisions are made in the equipment during its life as in the aircraft industry, production of parts and/or maintenance catalogs by conventional techniques is even more time consuming and expensive.

For example, an aircraft manufacturer may provide different features in a particular aircraft model in accordance with each customer's specifications. Each customer must therefore have its own customized parts and/or maintenance catalog with which to maintain its aircraft and to order spare parts for the maintenance of its aircraft. Moreover, because of the large number of engineering changes made during the life of an aircraft, a customer may require a new catalog for its aircraft on as frequent as a monthly basis.

To produce a customized parts catalog with an illustrated text, each illustrated page must be prepared by the above described photographic method. The pages composed in this manner may not be useable in catalogs for other customers since the merging of textual and illustrative materials may not occur in the same manner in subsequent catalogs. Thus, for each catalog it may be necessary to recompose each page of the illustrated and textual materials.

It is accordingly an object of the present invention to provide a novel method and system for producing illustrated texts.

It is a further object of the present invention to provide a novel method and system for rapidly and economically producing customized illustrated texts and particularly illustrated parts catalogs.

It is yet another object of the present invention to provide a novel method and system for combining textual material with illustrations wherein the textual material is produced electronically and the illustrations are selectively combined with the textual materials in response to an indication accompanying the textual materials.

It is yet a further object of the present invention to provide a novel method and system for producing illustrated texts wherein textual material including accompanying illustration indication indicia is stored and portions of the textual material are selected and displayed electronically for combination with an optically projected illustration selected in response to the indicia.

These and other objects and advantages of the present invention will become apparent to one skilled in the art to which the invention pertains from a perusal of the following description when read in conjunction with the attached drawings.

DESCRIPTION OF THE PREFERRED EMBODIMENT

Figure 1:
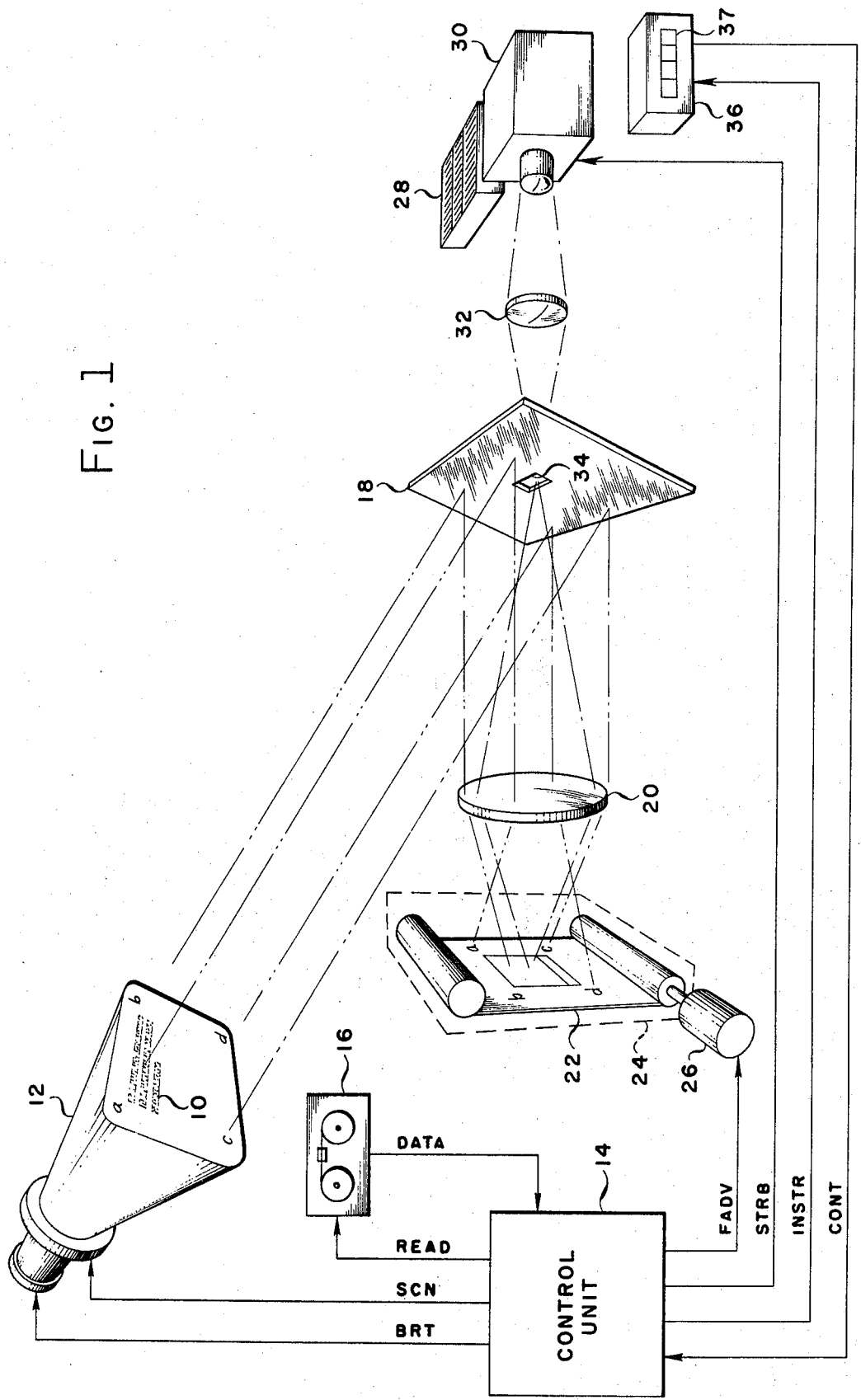
FIG. 1 is a functional block diagram pictorially illustrating the system of the present invention.

A system for producing illustrated texts in accordance with the present invention is illustrated pictorially in block diagram form in FIG. 1 to facilitate an understanding of the present invention.

Referring now to FIG. 1, textual material generally indicated at 10 may be electronically formed and displayed in a suitable conventional manner such as by controlling the scanning of a cathode ray tube 12 in response to output signals from a control unit 14. For example, stored textual material including other data such as identifying codes and illustration identifying indicia may be read from a magnetic tape or other suitable storage means by a tape reader 16 in response to a read command or a READ signal from the control unit 14.

The output signal from the tape reader 16 may be applied to the control unit 14 as the DATA signal and portions of the DATA signal may be selected by the control unit 14 for display in accordance with a code identifying those portions to be displayed. The selected portions of the DATA signal may then be processed by the control unit 14 in any suitable conventional manner to provide cathode ray tube scan and brightness control signals SGN and BRT, respectively, to thereby provide electronic display of the selected portions of the textual material.

The image of the textual material 10 on the face of the cathode ray tube 12 may be reflected by a suitable reflector 18 and focused through a suitable lens system generally indicated at 20 onto an image plane defined by a suitable photographic material such as the film 22 shown in FIG. 1. The film 22 may be, for example, sprocketed or unsprocketed 16 or 35 millimeter microfilm mounted in a suitable camera indicated in phantom at 24. A suitable film advance motor 26 in the camera 24 or externally thereof may be energized in response to a film advance or FADV signal from the control unit 14 to advance the film 22 a predetermined amount, e.g., 1 microfilm frame.

A large number of illustrations, preferrably in the form of slides, may be cataloged in any suitable manner as is generally indicated at 28 to permit rapid retrieval of a selected slide. An image of an illustration may be projected from the selected slide by a slide projector 30 through a suitable lens system 32, through the reflector 18 and the lens system 20 and onto the image plane defined by the film 22 in the camera 24 in response to a strobe or STRB signal from the control unit 14.

The reflector 18 may be any suitable conventional device such as a dichroic mirror which reflects all light striking one side thereof but allows light striking the other side thereof to pass therethrough, thus permitting the image from the slide projector 24 to pass therethrough. Alternately, the reflector 18 may be a mirror provided with a small aperture 34 sufficient in size to pass the zero order defraction pattern of the projected image. Mirror and lens optical systems suitable for combining images in the manner described above are described in U.S. Pat. No. 3,673,932 and No. 3,673,933.

A suitable conventional input/output unit (I/O unit) 36 such as a conventional typewriter and/or pushbutton control unit may be provided for control and visual display purposes. For example, the input/output 36 may be utilized to enter a control signal CONT such as a customer identifying code, a start code and/or a continue code into the control unit 14 as is subsequently described in detail in connection with FIG. 2. The entered code may control, for example, the reading of the DATA signal from the tape reader 16, the selection and electronic display of textual material on the face of the cathode ray tube and the merging of textual and illustrative material.

Moreover, the input/output unit 36 may provide the operator of slide projector 30 with visual instructions during the production of the illustrated text. For example, an instruction or INSTR signal may be supplied from the control unit 14 and effect the typing or other display of illustration identifying indicia as is indicated at 37 when an illustration is to be merged with textual material as will be subsequently described in greater detail.

In operation, all of the textual material together with data as to the illustrations to be inserted in the textual material for a particular customer catalog may be prepared and stored for subsequent reading by the control unit 14. In the FIG. 1 embodiment, for example, the ordered, customized catalog may be stored in a suitable coded form on magnetic or punched tape, or other suitable data storage media, and read by the control unit 14 from the tape reader 16 as the DATA signal in response to the READ signal.

The operator may commence the production of the customized catalog by typing or otherwise generating a coded "start" instruction to command the control unit 14 to commence the reading of data from the tape reader 16 or other input device. As a page of data is read, the textual portions thereof are displayed by generating analog cathode ray tube control signals BRT and SCN in a suitable conventional manner.

For example, the first series of pages may include a title page and several table of contents pages. The control unit 14 may electronically display each successive page and record each page on a frame of the film 22. In this connection, the electronically displayed image of the textual material may be reflected by the mirror 18 onto an image plane defined by the film 22 and properly focused on the image plane by the lens system 20. At the end of each page as determined by the control unit 14 in response to an "end of page" code in the DATA signal, the control unit 14 may generate the film advance or FADV signal to advance the film 22 one frame.

As the production of the customized parts catalog proceeds in this manner, spaces or entire pages on which illustrative material is to be inserted may be indicated by the DATA signal. Where illustrative material is to be added, textual material such as headings or descriptions, figure numbers and page numbers may be electronically displayed on the cathode ray tube 12 and an instruction signal INSTR identifying the illustration to be inserted in the textual material may be displayed on the display 37 of the input/output unit 36.

The operator may then select from the tray 28 the slide upon which the illustration designated for display appears and place the selected slide into the slide projector 30. The operator may then instruct the control unit 14 to continue and the control unit 14 may then generate the strobe signal STRB to strobe the slide projector 30. The strobing of the slide projector 30 effects the projection of the image of the illustrative material on the slide onto the image plane defined by the film 22 through the lens systems 20 and 32 and the mirror 18. The alignment of the optical system and the predetermined position of the illustration on the slide insure proper registration of the textual and illustrative material on the film 22 thus providing the desired composite photographic record.

The instruction from the operator may also generate the film advance signal FADV a short time later to advance the film 22 one frame and, after the film has been advanced, to generate the READ signal to continue reading data from the tape reader 16. This process may continue with the control unit 14 automatically displaying and recording textual material and pausing for the insertion of designated illustrative material as is hereinafter described in greater detail in connection with FIG. 2.

Of course, the slides utilized to combine illustrative material with the electronically displayed textual material may be selected automatically in response to the INSTR signal from the control unit 14 in any suitable conventional manner. After automatically selecting the slide, the insertion of the slide into the slide projector 30 may effect the automatic generation of the continue signal to inform the control unit 14 that the slide containing the desired illustrative material is available for projection onto the film 22. In this manner, the production of the customized catalog from the tape on the tape reader 16 or other input device may be entirely automated, requiring an operator solely for the purpose of changing tapes and starting the process once the desired tape is in place.

The control unit 14 may operate to display textual material on the cathode ray tube 12 and to generate the various signals required during the production of a customized parts catalog in any suitable manner. One way in which these functions may be performed is illustrated in and is hereinafter described in connection with FIG. 2.

Figure 2:
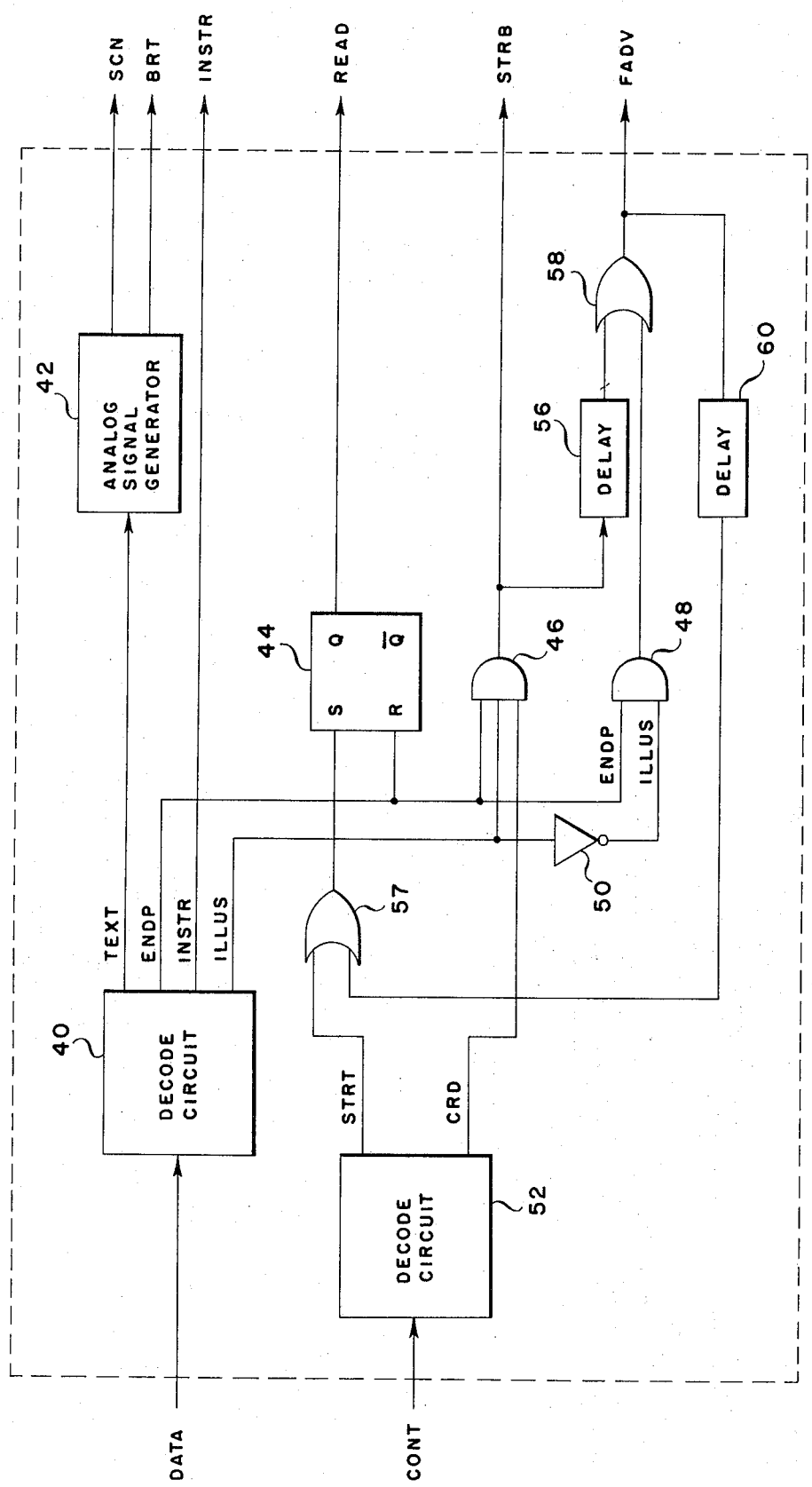
FIG. 2 is a functional block diagram of the control unit of FIG. 1.

Referring now to FIG. 2, the DATA signal from the tape reader 16 may be applied to a suitable conventional decoder circuit 40 for decoding of the various instructions contained in the DATA signal. Textual material in the DATA signal may be applied from the decode circuit 40 to a suitable conventional analog signal generator 42 as the TEXT signal for generation of the scan and brightness signals SCN and BRT, respectively, which effect the electronic display of the textual material. The decode circuit 40 may also generate an end of page or ENDP signal upon recognition of a code indicating that one full page of textual material, which may contain space for illustrative material, has been read, or one full page of illustrative material has been indicated. The ENDP signal may be applied to the reset input terminal R of a suitable conventional bistable multivibrator or flip-flop 44, to one input terminal of a three input terminal AND gate 46 and to one input terminal of a two input terminal AND gate 48.

The decode circuit 40 may also generate an "illustration present" signal ILLUS indicating that illustrative material is present on the current page of material and must be inserted as was previously described in connection with FIG. 1. This ILLUS signal may be applied to a second input terminal of the AND gate 46 and through an inverter 50 to the other input terminal of the two input terminal AND gate 48. The portion of the DATA signal which actually identifies the particular illustration to be inserted on the current page may be provided by the decode circuit 40 as the INSTR signal for visual display in the event that the slide is to be selected by the operator or alternatively for automatic selection of a slide.

The control or CONT signal from the input/output unit 36 may be applied to a suitable conventional decode circuit 52 for decoding and generation of a start signal STRT provided by the operator at the commencement of the production of the catalog. During the production of the catalog an instruction may be generated when a slide is in place in the projector and transmitted to the control unit 14 as the CONT signal for decoding as the continue read signal CRD.

The STRT signal may be applied to one input terminal of a two input terminal OR gate 54 and the CRD signal may be applied to the third input terminal of the AND gate 46. The output signal from the OR gate 54 may be applied to the set input terminal S of the flip-flop 44 and the output signal from the true or Q output terminal of the flip-flop 44 may be supplied as the READ signal from the control unit 14 for application to the tape reader 16.

The output signal from the AND gate 46 may be provided as the strobe or STRB signal for strobing the slide projector 30 and may also be delayed through a suitable conventional delay circuit 56 and applied to one input terminal of a two input terminal OR gate 58. The output signal from the AND gate 48 may be applied to the other input terminal of the OR gate 58 and the output signal from the OR gate 58 may be provided as the film advance or FADV signal for application to the film advance motor 26 of FIG. 1. The FADV signal may also be delayed through a suitable conventional delay circuit 60 for application to the other input terminal of the OR gate 54.

In operation, the operator may initially apply a coded control signal to the control unit 14 indicating the commencement of catalog production. This control signal may be decoded by the decode circuit 52 as the start or STRT signal and the STRT signal may set the flip-flop 44 through the OR gate 54 to provide the READ signal. The READ signal in turn effects the reading of the DATA signal from the tape reader 16.

As the DATA signal is applied to the control unit 14 from the tape reader 16 in response to the READ signal, the textual material is routed to the analog signal generator 42 by the decode circuit 40. At the end of each page, the ENDP signal is generated resetting the flip-flop 44 and halting the reading of the tape on the tape reader 16.

In the event that no illustration is present on a page, the ENDP signal and the negative ILLUS signal generate the film advance or FADV signal through the AND gate 48 and the OR gate 58. The film advance signal FADV advances the film 22 of FIG. 1 and is also delayed and utilized to set the flip-flop 44 via the OR gate 54 to thereby continue the reading of the DATA signal from the tape reader 16 of FIG. 1.

If an illustration is present on the page of material just read, any accompanying textual material is displayed and and illustration identification signal INSTR instructs the operator as to which slide to place in the slide projector 30. The ILLUS signal is generated indicating that an illustration is present on the page and, when the slide has been placed in the slide projector 30, the operator indicates that the production of the catalog may continue by transmitting a continue read or CRD signal to the control unit 14.

When the CRD signal, the ILLUS signal and the ENDP signal are all present simultaneously, the AND gate 46 generates the strobe or STRB signal to strobe the slide projector 30 and thereafter provides a film advance or FADV signal via the delay circuit 56 and the OR gate 58. The generation of the FADV signal then initiates the reading of the next page of material as was previously described.

The control unit 14 may, of course, comprise a general purpose digital computer suitably programmed to perform the functions described in connection with FIGS. 1 and 2. Moreover, the tape supplying the DATA signal to the control unit 14 may include the textual and illustration identifying indicia applicable to all customer catalogs and the control unit 14 may sort and compile this data in accordance with a stored program to generate each customized catalog.

For example, each block of data on the storage tape may be identified by a customer code or, in the event that the material is to be common to all customer catalogs, by a more general code. To provide a particular customer with an illustrated parts catalog, a customer code may be entered by the operator through the input/output unit 36 and the control unit 14 may be programmed to sort out and compile in a predetermined order all textual and illustration identifying indicia pertaining to that particular customer. After this data has been compiled, the control unit 14 may be programmed to operate in a manner similar to that described in connection with FIG. 2 to electronically present the textual material on the face of the cathode ray tube 12 for generating the composite photographic record by insertion of the illustrations as designated by the control unit 14.

An example of a program having great utility in the system of the present invention is disclosed and claimed in the copending application Ser. No. 323,324 by C.H. Voorhees, filed concurrently herewith and assigned to the assignee hereof.

After having exposed the film 22 and generated a photographic record in the manner described above, the film may be developed and thereafter utilized in any suitable conventional manner to produce the recorded illustrated text. For example, the film may be placed in a suitable conventional film printer to produce the text from the photographic record. The film may be duplicated in the form of a catalog any number of times as required by the individual customer.

It can be seen from the foregoing that very long and highly illustrated texts such as parts catalogs may be readily and economically produced in accordance with the present invention. For example, approximately one thousand pages per hour may be transferred to microfilm in accordance with the present invention thereby providing an extremely high production rate. Moreover, the present invention permits the reuse of illustrative materials, i.e., the slides, until the illustration is obsolete whereas previous systems have ordinarily required the rephotographing of illustrations each time a catalog was published.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. Apparatus for high-speed production of customized illustrated texts comprising:
   a plurality of optically-projectable illustrative materials;
   means for storing textual material and illustration-identifying indicia associated with at least some of the textual material;
   means for successively selecting page-length portions of textual and illustrative material in a predetermined order;
   means for displaying an image of the textual portion of the selected material on an image plane;
   means for providing an image of the illustrative portion of the selected material onto the image plane;
   means including photographic film disposed in the image plane for photographically recording the image of the textual material and the image of the illustrative material to provide a composite photographic record of the selected textual and illustrative materials; and,
   means for producing an illustrated text from the composite photographic record.

2. The apparatus of claim 1 including:
   means for visually displaying said illustration-identifying indicia.

3. The apparatus of claim 1 wherein said displaying means comprises a cathode ray tube.

4. The apparatus of claim 1 wherein said film includes a plurality of frames, each of the frames corresponding to a page of the illustrated text, said photographic recording means further including film advance means for advancing said film upon exposure of a frame.

5. The apparatus of claim 4 wherein said displaying means comprises:
   a cathode ray tube for electronically forming the image of the textual material;
   reflector means for reflecting the image formed on the cathode ray tube onto a frame of said film; and
   lens means intermediate the cathode ray tube and the tube and the film for focusing the electronically formed image on the frame of said film.

6. The apparatus of claim 5 wherein each of said optically-projectable illustrative materials comprises a selectable photographic slide, and wherein said image providing means includes a slide projector for projecting the image of the illustrative material on the photographic slide, and lens means for focusing the projected image on the image plane.

7. A high-speed producer of illustrated texts comprising:
   a machine-readable record of the desired illustrated text including textual material and illustration-identifying indicia;
   means for reading said record of the desired illustrated texts;
   a cathode ray tube;
   means responsive to the reading by said record reading means of the textual material in said record for electronically displaying textual material on at least a portion of the face of said cathode ray tube from the rear thereof;
   means for exposing a frame of film to the displayed textual material;
   means operable in response to the reading by said record reading means of a given illustration identifying indicium from said record for exposing the same frame of film with a selected illustration identified by said given indicium to provide a single frame composite photographic record of the textual material and the selected illustration; and,
   means for reproducing said photographic record in the form of an illustrated text.

8. The apparatus of claim 7 including means for visually displaying the illustration identifying indicia whereby said illustration can be selected in accordance with the displayed indicia.

9. The apparatus of claim 8 wherein said illustration is recorded on a photographic slide and wherein said exposing means includes a slide projector focused on said film.

10. A method of producing a multiple-page illustrated text at high speed comprising the steps of:
   a. providing a machine-readable record of the textual material desired to be produced, the record having illustration-identifying indicia at spaced positions in the textual material as determined by the related textual material;
   b. providing a plurality of selectively optically-projectable images each including at least one of the desired illustrations identified on the record;
   c. initiating the reading of the record until either an end-of-page condition or an illustration-identifying-indicium-present condition occurs;
   d. interrupting the reading of the record in response to the detection of an end-of-page condition or an illustration-identifying-indicium-present condition and electronically displaying the textual material read from the record;
   e. exposing a frame of film with the displayed textual material;
   f. interrupting the reading of the record in response to the reading of illustration-identifying indicia in the record and visually displaying the illustration-identifying indicia read from record;
   g. selecting the optically-projectable image designated by the displayed indicia from the plurality of optically projectable images;
   h. exposing the same frame of film with the identified one of the illustrations; and,
   i. continuing with the reading of the record.

* * * * *